US010449947B2

(12) United States Patent
Huh et al.

(10) Patent No.: US 10,449,947 B2
(45) Date of Patent: Oct. 22, 2019

(54) APPARATUS FOR CONTROLLING CHARGING OF ENVIRONMENT-FRIENDLY VEHICLE, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventors: Jee Wook Huh, Bucheon-si (KR); Kyoung Cheol Oh, Suwon-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 259 days.

(21) Appl. No.: 15/708,407

(22) Filed: Sep. 19, 2017

(65) Prior Publication Data
US 2019/0023259 A1   Jan. 24, 2019

(30) Foreign Application Priority Data

Jul. 20, 2017 (KR) .......................... 10-2017-0092195

(51) Int. Cl.
*B60W 20/13* (2016.01)
*B60W 10/06* (2006.01)
(Continued)

(52) U.S. Cl.
CPC ............ *B60W 20/13* (2016.01); *B60W 10/06* (2013.01); *B60W 10/08* (2013.01); *B60W 10/26* (2013.01);
(Continued)

(58) Field of Classification Search
CPC ...... B60W 20/13; B60W 20/12; B60W 10/26; B60W 10/08; B60W 10/06;
(Continued)

(56) References Cited

U.S. PATENT DOCUMENTS 6,166,523 A    12/2000  Singh et al.
2010/0019729 A1*  1/2010  Kaita .................. B60L 58/25
                                                          320/134
(Continued)

FOREIGN PATENT DOCUMENTS

JP       2015-217690 A    12/2015
JP          5842927 B2     1/2016
KR    10-2009-0039918 A    4/2009

*Primary Examiner* — Mary Cheung
(74) *Attorney, Agent, or Firm* — Morgan, Lewis & Bockius LLP

(57) ABSTRACT

An apparatus for controlling charging of an environment-friendly vehicle, a system including the same, and a method thereof; the apparatus comprises a controller including a processor communicatively connected to the controller and configured to form: a predicted state of charge (SOC) calculating module configured to calculate a predicted SOC predicted to be consumed when the vehicle travels until the vehicle reaches a destination; a current SOC calculating module configured to calculate a current SOC of the vehicle; a mode start control module configured to determine a first mode in which the vehicle travels through driving of an electric motor and a second mode in which the vehicle travels through driving of an electric motor even though the current SOC is not more than a reference SOC, by using the predicted SOC and the current SOC; and an SOC adjusting module configured to adjust a minimum SOC use area when the vehicle starts the second mode.

20 Claims, 7 Drawing Sheets

(51) Int. Cl.
*B60W 10/08* (2006.01)
*B60W 10/26* (2006.01)
*B60W 20/12* (2016.01)

(52) U.S. Cl.
CPC ....... *B60W 20/12* (2016.01); *B60W 2510/244* (2013.01); *B60W 2550/12* (2013.01); *B60W 2550/142* (2013.01); *B60W 2550/402* (2013.01); *Y10S 903/93* (2013.01)

(58) Field of Classification Search
CPC ..... B60W 2550/402; B60W 2550/142; B60W 2510/244; B60W 2550/12; Y10S 903/93
See application file for complete search history.

(56) References Cited

U.S. PATENT DOCUMENTS

| | | | |
|---|---|---|---|
| 2011/0156652 A1* | 6/2011 | Kishiyama | B60L 58/12 320/132 |
| 2011/0166733 A1* | 7/2011 | Yu | B60K 6/445 701/22 |
| 2012/0035795 A1* | 2/2012 | Yu | B60W 50/0097 701/22 |
| 2013/0062941 A1* | 3/2013 | Yamamoto | B60K 6/445 307/10.6 |
| 2014/0229043 A1* | 8/2014 | Frank | B60W 20/20 701/22 |
| 2014/0257636 A1 | 9/2014 | Ueki et al. | |
| 2015/0232082 A1* | 8/2015 | Frank | B60W 20/10 701/22 |
| 2015/0291145 A1* | 10/2015 | Yu | B60W 10/06 701/22 |
| 2015/0333564 A1 | 11/2015 | Miyashita et al. | |
| 2016/0159337 A1* | 6/2016 | Hisano | B60W 10/26 701/22 |

* cited by examiner

APPARATUS FOR CONTROLLING CHARGING OF ENVIRONMENT-FRIENDLY VEHICLE, SYSTEM INCLUDING THE SAME, AND METHOD THEREOF

CROSS-REFERENCE TO RELATED APPLICATION

This application is based on and claims the benefit of priority to Korean Patent Application No. 10-2017-0092195, filed on Jul. 20, 2017, in the Korean Intellectual Property Office, the disclosure of which is incorporated herein in its entirety by reference.

TECHNICAL FIELD

The present disclosure relates to an apparatus for controlling charging of an environment-friendly vehicle, a system including the same, and a method thereof, and more particularly to a technology of increasing fuel efficiency by adjusting a minimum state of charge (SOC) use area.

BACKGROUND

Due to the high prices of oils and regulation of exhaust gases throughout the world, environment-friendly policies and improvement of fuel efficiency have become core goals in the development of vehicles. Accordingly, the vehicle manufacturers are making a lot of efforts to develop technologies for reducing both use of fuels and generation of exhaust gases for the environment-friendly policies and high fuel efficiency.

Under the background, many interests and efforts are being made in the development of technologies such as hybrid electric vehicles (HEVs) and plug-in hybrid electric vehicles (PHEVs), which combine the power of an engine and a motor for high fuel efficiency.

The hybrid electric vehicles satisfy purchase needs of many customers due to the high fuel efficiency and environment-friendly images.

However, in the hybrid electric vehicle, engine efficiency decreases as the engine is unconditionally driven for diagnosis and warming-up when the vehicle is initially started after being parked, and fuel efficiency eventually deteriorates as discharging-oriented control for adjusting a state-of-charge (SOC) of the vehicle to a reference SOC when the vehicle is restarted after being parked.

SUMMARY

The present disclosure provides an apparatus for controlling charging of an environment-friendly vehicle that may enhance fuel efficiency by lowering a minimum SOC use area of the environment-friendly vehicle and deriving driving using electrical energy, a system including the same, and a method thereof.

The technical objects of the present disclosure are not limited to the above-mentioned one, and the other unmentioned technical objects will become apparent to those skilled in the art from the following description.

In accordance with an aspect of the present disclosure, there is provided an apparatus for controlling charging of a vehicle, the apparatus comprises a controller including a processor communicatively connected to the controller and configured to form a predicted state of charge (SOC) calculating module configured to calculate a predicted SOC predicted to be consumed when the vehicle travels until the vehicle reaches a destination; a current SOC calculating module configured to calculate a current SOC of the vehicle; a mode start control module configured to determine a first mode in which the vehicle travels through driving of an electric motor and a second mode in which the vehicle travels through driving of an electric motor even though the current SOC is not more than a reference SOC, by using the predicted SOC and the current SOC; and an SOC adjusting module configured to adjust a minimum SOC use area when the vehicle starts the second mode.

According to an embodiment, the predicted SOC calculating module may calculate the predicted SOC by using air resistance, rolling resistance, and hill-climbing resistance.

According to an embodiment, the air resistance and the rolling resistance may be calculated by using a velocity and a coast-down value of the vehicle.

According to an embodiment, the mode start control module may start the second mode when the current SOC is greater than a sum of a target SOC and the predicted SOC.

According to an embodiment, when the vehicle is a hybrid electric vehicle (HEV), the mode start control module may start a third mode in which the vehicle travels through driving of an engine when the current SOC is less than the reference SOC and is less a sum of the target SOC and the predicted SOC.

According to an embodiment, when the vehicle is a plug-in hybrid electric vehicle (PHEV), the first mode may be in a charge depleting (CD) mode in which the vehicle travels by using electricity.

According to an embodiment, the mode start control module may start a fourth mode that is a charge sustaining (CS) mode in which the vehicle travels through both driving of an electric motor and an engine when the current SOC is less than the reference SOC and is less than the sum of the target SOC and the predicted SOC.

According to an embodiment, the apparatus further may include an EV line raising module configured to, when the second mode is started, raise an EV line that is a reference condition for driving an engine.

According to an embodiment, the minimum SOC use area may correspond to a minimum SOC for starting an idle charge mode.

According to an embodiment, the SOC adjusting module may lower the minimum SOC use area.

According to an embodiment, the SOC adjusting module may lower the minimum SOC use area to lower the reference SOC such that the vehicle does not start an idle charge mode even though the current SOC reaches a predetermined reference SOC when the vehicle starts the second mode.

In accordance with another embodiment, there is provided a vehicle system for controlling charging of a vehicle, the system comprises a battery configured to electrical energy to a vehicle; a controller including a processor communicatively connected to the controller for controlling charging of the vehicle, the processor being configured to calculate a predicted SOC and a current SOC, to control whether the vehicle starts a first mode in which the vehicle travels with electrical energy or a second mode in which the vehicle travels until the vehicle reaches a destination with electrical energy even though the current SOC is not more than a reference SOC by using the predicted SOC and the current SOC, and to induce a driving mode using the electrical energy by lowering a minimum SOC use area when the vehicle starts the second mode.

According to an embodiment, the apparatus may include a predicted SOC calculating module configured to calculate a predicted SOC predicted to be consumed when the vehicle travels until the vehicle reaches a destination, a current SOC calculating module configured to calculate a current SOC of the vehicle, a mode start control module configured to determine whether the vehicle starts a first mode in which the vehicle travels with electrical energy or a second mode in which the vehicle travels with electrical energy until the vehicle reaches a destination even though the current SOC is not more than a reference SOC, by using the predicted SOC and the current SOC, and an SOC adjusting module configured to adjust a minimum SOC use area when the vehicle starts the second mode.

In accordance with another aspect of the present disclosure, there is provided a method for controlling charging of a vehicle, the method comprises calculating, by a processor, a predicted SOC to predicted to be consumed when the vehicle travels until the vehicle reaches a destination; calculating, by the processor, a current SOC of the vehicle; determining, by the processor, whether the vehicle starts a first mode in which the vehicle travels with electrical energy and a second mode in which the vehicle travels with electrical energy even though the current SOC is not more than a reference SOC, by using the predicted SOC and the current SOC; and lowering a minimum SOC use area when the vehicle starts the second mode.

According to an embodiment, the determining of whether the vehicle starts the first mode or the second mode may include if the current SOC is greater than a predetermined reference SOC, controlling the vehicle such that the vehicle starts a first mode (EV mode), when the current SOC is less than the reference SOC and more than a sum of a target SOC and the predicted SOC, starting a second mode (SOC use mode), and when the current SOC is less than the reference SOC and less than the sum of the target SOC and the predicted SOC, starting a third mode (HEV mode).

According to an embodiment, the determining of whether the vehicle start the first mode or the second mode includes if the current SOC is greater than a predetermined reference SOC, controlling the vehicle such that the vehicle starts a first mode (CD mode), when the current SOC is less than the reference SOC and more than a sum of a target SOC and the predicted SOC, starting a second mode (SOC use mode), and when the current SOC is less than the reference SOC and less than the sum of the target SOC and the predicted SOC, starting a third mode (CS mode).

According to an embodiment, the method may further include when the second mode is started, raising an EV line that is a reference condition for driving an engine.

According to an embodiment, the calculating the predicted SOC may include calculating the predicted SOC by using air resistance, rolling resistance, and hill-climbing resistance.

According to an embodiment, the minimum SOC use area may correspond to a minimum SOC for starting an idle charge mode.

According to an embodiment, the lowering of the minimum SOC use area may include lowering the minimum SOC use area to lower the reference SOC such that the vehicle does not start an idle charge mode even though the current SOC reaches a predetermined reference SOC when the vehicle starts the second mode.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
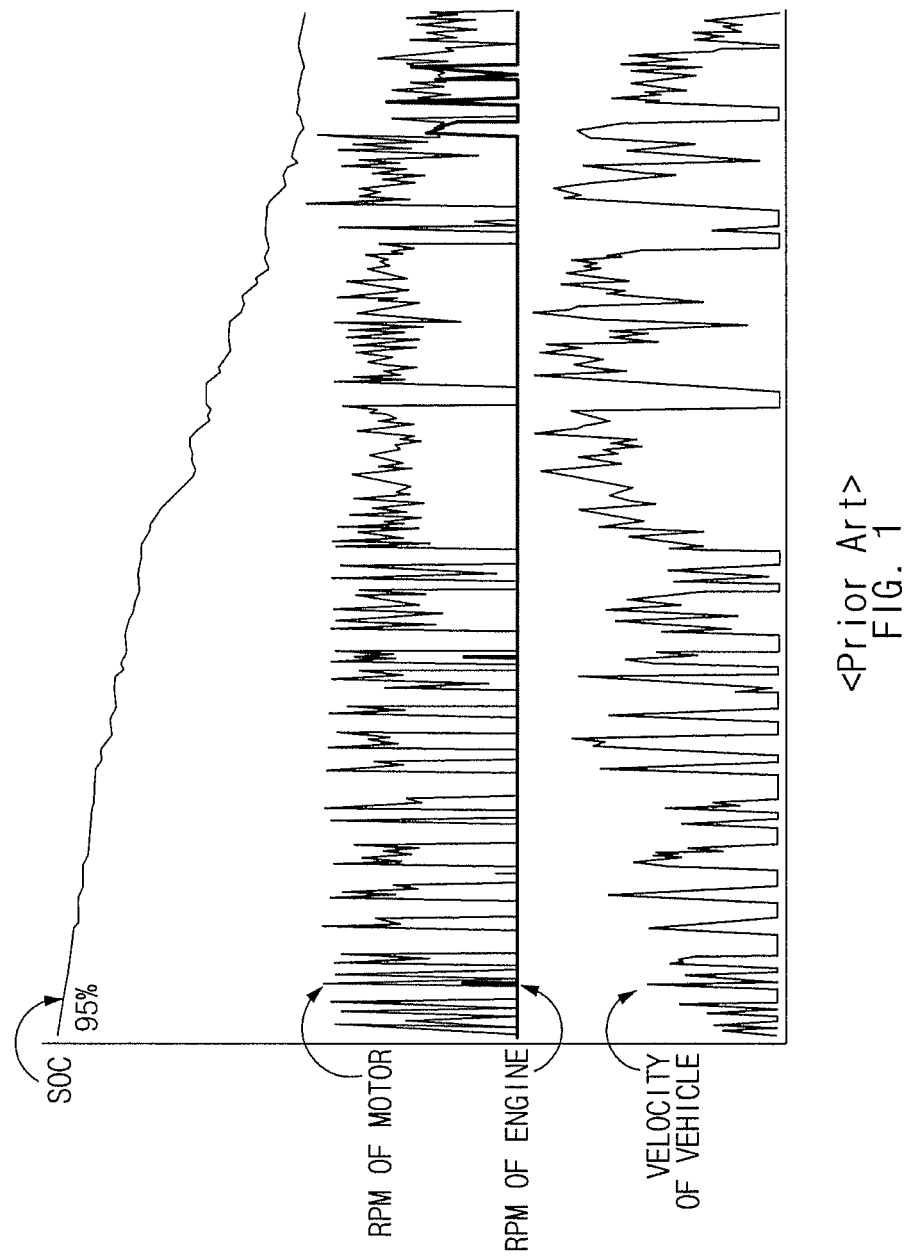
FIG. 1 shows a graph illustrating an engine driving time point according to a general charging control.

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

The vehicle according to the present disclosure is an environment-friendly vehicle that travels while an electric motor is driven by a high-voltage battery, and may include a hybrid electric vehicle (HEV), an electric vehicle (EV), a plug-in hybrid vehicle (PHEV), and a fuel cell electric vehicle (FCEV). In particular, a technology of controlling charging of an HEV and a PHEV will be described as an embodiment of the present disclosure.

The HEV according to the present disclosure travels in a first mode (an EV mode) in which the vehicle travels while only an electric motor is driven when the velocity of the vehicle is less than a specific velocity or the current SOC of the vehicle is a reference SOC or more, a second mode (an SOC use mode) in which the vehicle travels with a force of the electric motor when the current SOC of the vehicle is greater than a sum of a predicted SOC consumed until the vehicle reaches a destination and a target SOC even though the current SOC of the vehicle is less than the reference SOC, and a third mode (an HEV mode) in which the vehicle travels with the force of an engine when the velocity of the vehicle is the specific velocity or more or the current SOC is less than the reference SOC, and the current SOC of the vehicle is less than the sum of the predicted SOC consumed until the vehicle reaches the destination and the target SOC.

The PHEV according to the present disclosure travels in a first mode (an EV mode=a charge depleting (CD) mode) in which the vehicle travels while only an electric motor is driven when the velocity of the vehicle is less than a specific velocity or the current SOC of the vehicle is a reference SOC or more, a second mode (an SOC use mode) in which the vehicle travel with the force of an electric motor when the current SOC of the vehicle is less than the reference SOC and the current SOC of the vehicle is greater than a sum of a predicted SOC consumed until the vehicle reaches a destination and a target SOC, and a fourth mode (a charge sustaining (CS) mode) in which the vehicle travels while the mode of the vehicle is classified into an EV mode and an HEV mode according to required power of the driver, the current SOC, the velocity of the vehicle, and the like when the current SOC of the vehicle is less than the reference SOC and the current SOC of the vehicle is less than a sum of the predicted SOC consumed until the vehicle reaches the destination and the target SOC.

Here, the CD mode refers to a section of the EV mode in which the vehicle travels only with the force of a driving motor by using a voltage charged in a battery. In the CD mode, because a high voltage may be used as the SOC of the battery is excellent, the vehicle travels in almost all sections only with the power of the driving motor when it does not come to a special situation.

The CS mode refers to a section in which the vehicle travels through suitable combination of an engine and a driving motor in a way that is similar to the HEV mode after a specific amount of the voltage charged in a battery is used. In the CS mode, because an amount of a usable voltage is relatively small as the SOC of the battery is insufficient, the vehicle travels through combination of the driving forces of the engine and the driving motor, thereby improving fuel efficiency and maintaining the SOC of the battery properly.

Hereinafter, exemplary embodiments of the present disclosure will be described in detail with reference to FIGS. 2 to 7.

Figure 2:
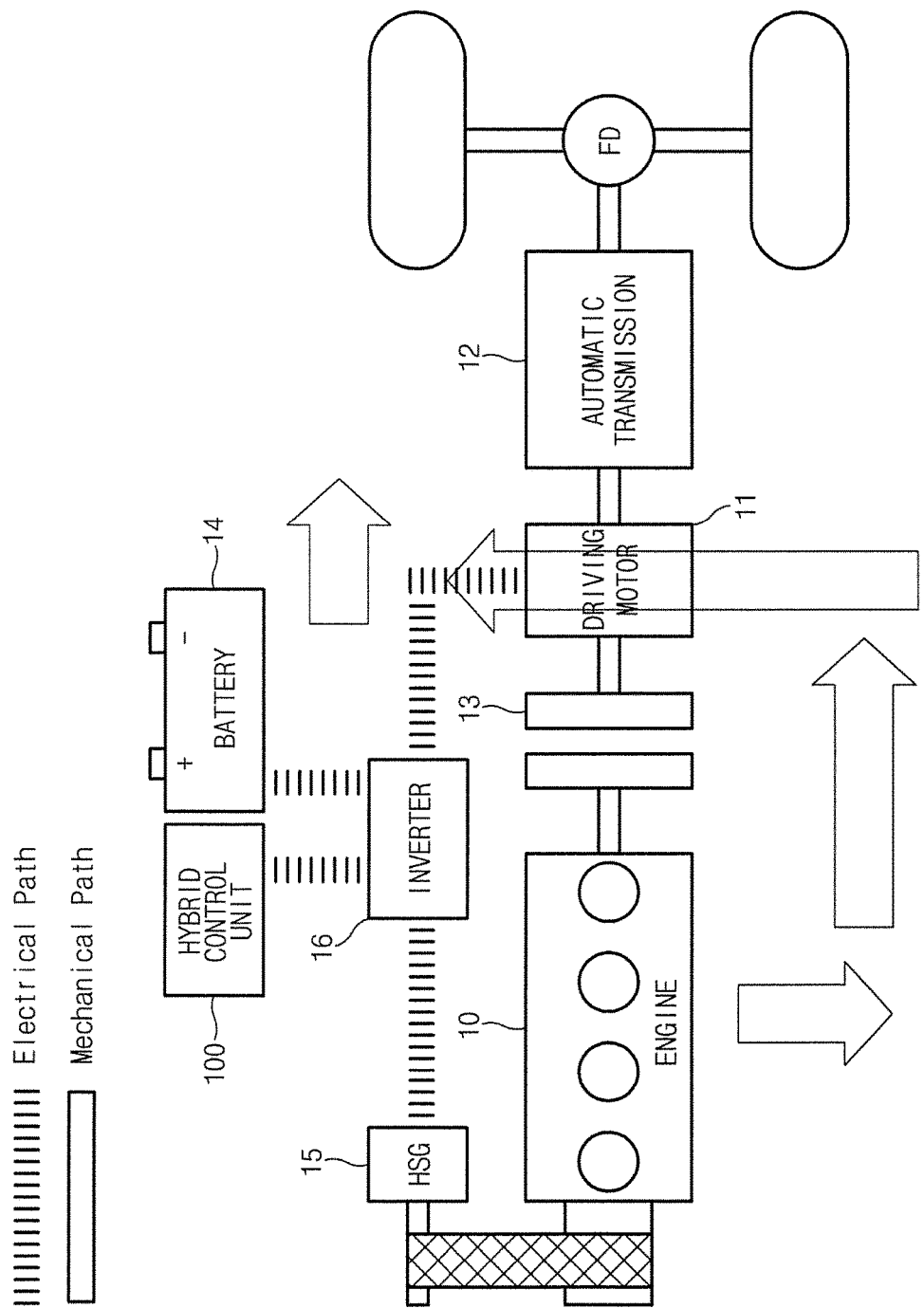
FIG. 2 shows a diagram of an environment-friendly vehicle according to an embodiment of the present disclosure.

FIG. 2 shows a diagram of an environment-friendly vehicle according to an embodiment of the present disclosure.

Referring to FIG. 2, a hybrid electric vehicle that is an environment-friendly vehicle has a layout in which an engine 10, a driving motor (an electric motor) 11, and an automatic transmission 12 are arranged in a row.

In particular, the engine 10 and the driving motor 11 are connected to each other while an engine clutch 130 is interposed therebetween such that power may be transmitted therebetween, and the driving motor 11 and the automatic transmission 12 are directly connected to each other. In addition, the hybrid electric vehicle may include, in addition to an engine control module (not illustrated) connected to the engine 10, a driving motor control module (not illustrated) connected to the driving motor 11, and an automatic transmission control module (not illustrated) connected to the automatic transmission 120, a hybrid starter/generator (HSG) control module connected to an HSG 15, a battery control module (not illustrated) connected to a battery 14, and a hybrid controller (HCU) 100 configured to control the control modules.

The hybrid controller 100 is an uppermost level control module that is responsible for control of driving of the control modules, setting of a hybrid operation mode, and overall control of the vehicle, and the control modules, including the hybrid controller 100 that is an uppermost level control module, are connected to each other a high-velocity CAN communication line so that an upper level control module may deliver a command to its lower level module while the controllers transmit and receive information to and from each other.

In this configuration, a driving force is obtained only by the driving motor 11 when the vehicle starts or travels at a low velocity, and it is advantageous in an aspect of fuel efficiency of the vehicle to initially start (accelerate) the vehicle by using a driving motor 11, an efficiency of which is higher than that of the engine 10, because the efficiency of the engine 10 is lower than the efficiency of the driving motor 11 when the vehicle initially starts. Once the vehicle starts, the output of the engine 10 and the output of the driving motor 11 may be simultaneously used by starting the engine with the HSG 15.

Here, an operation of the hybrid electric vehicle will be described in detail below.

The engine 10 is an internal combustion engine that supplies power to the hybrid electric vehicle.

The driving motor 11 is a main power source for supplying electric power, and is connected to a high-voltage battery. The power of the driving motor 11 is classified into power that may be instantaneously output and power that may be continuously output, and the power that may be instantaneously output is high but may be used for a short time period and the power that may be continuously output is low but may be used for a long time period.

The transmission 12 may be a 6-gear automatic transmission, from which a torque converter is removed, and the HSG 15 may be used for engine cranking when the vehicle is started or the mode of the vehicle is converted in an idle stop state of the engine 10.

The clutch 13 is a device for connecting or disconnecting the power of the driving motor 11, and the shaft of the power may be arbitrarily connected or disconnected. The types of clutches include a claw clutch, a friction clutch, a fluid clutch, and an electromagnetic clutch.

The battery 14 is a device for storing electricity and supplying electricity to the vehicle system.

The HSG is a hybrid starter and generator that provides a rotational force (that is, output a cranking torque) to the engine 10 when the vehicle is started, and is connected to the engine 10. The HSG 15 improves interactivity by assisting control of a torque of the engine 10, and a belt is used such that the HSG 15 is connected to the engine 10 and the control of the torque may be made in consideration of a tension of the belt.

An inverter 16 is a current conversion device connected to the driving motor 11, the battery 14, and the HSG 15.

In the case of an HEV, the hybrid controller 100 controls the vehicle such that the vehicle travels in a first mode (an EV mode) in which the vehicle travels while only an electric motor is driven when the velocity of the vehicle is less than a specific velocity or the current SOC of the vehicle is a reference SOC or more, a third mode (an HEV mode) in which the vehicle travels with the force of an engine when the velocity of the vehicle is the specific velocity or more or the current SOC is less than the reference SOC, and a second mode (an SOC use mode) in which the vehicle travel with the force of an electric motor when the current SOC of the vehicle is greater than a sum of a predicted SOC consumed until the vehicle reaches a destination and a target SOC even though the current SOC of the vehicle is less than the reference SOC.

Further, in the case of the PHEV, the hybrid controller 100 controls the vehicle such that the vehicle travels in a first mode (an EV mode=a charge depleting (CD) mode) in which the vehicle travels while only an electric motor is driven when the velocity of the vehicle is less than a specific velocity or the current SOC of the vehicle is a reference SOC or more, a second mode (an SOC use mode) in which the vehicle travel with the force of an electric motor when the current SOC of the vehicle is less than the reference SOC and the current SOC of the vehicle is greater than a sum of a predicted SOC consumed until the vehicle reaches a destination and a target SOC, and a fourth mode (a charge sustaining (CS) mode) in which the vehicle travels while the mode of the vehicle is classified into to an EV mode and an HEV mode according to required power of the driver, the current SOC, the velocity of the vehicle, and the like when the current SOC of the vehicle is less than the reference SOC and the current SOC of the vehicle is less than a sum of the predicted SOC consumed until the vehicle reaches the destination and the target SOC.

Figure 3:
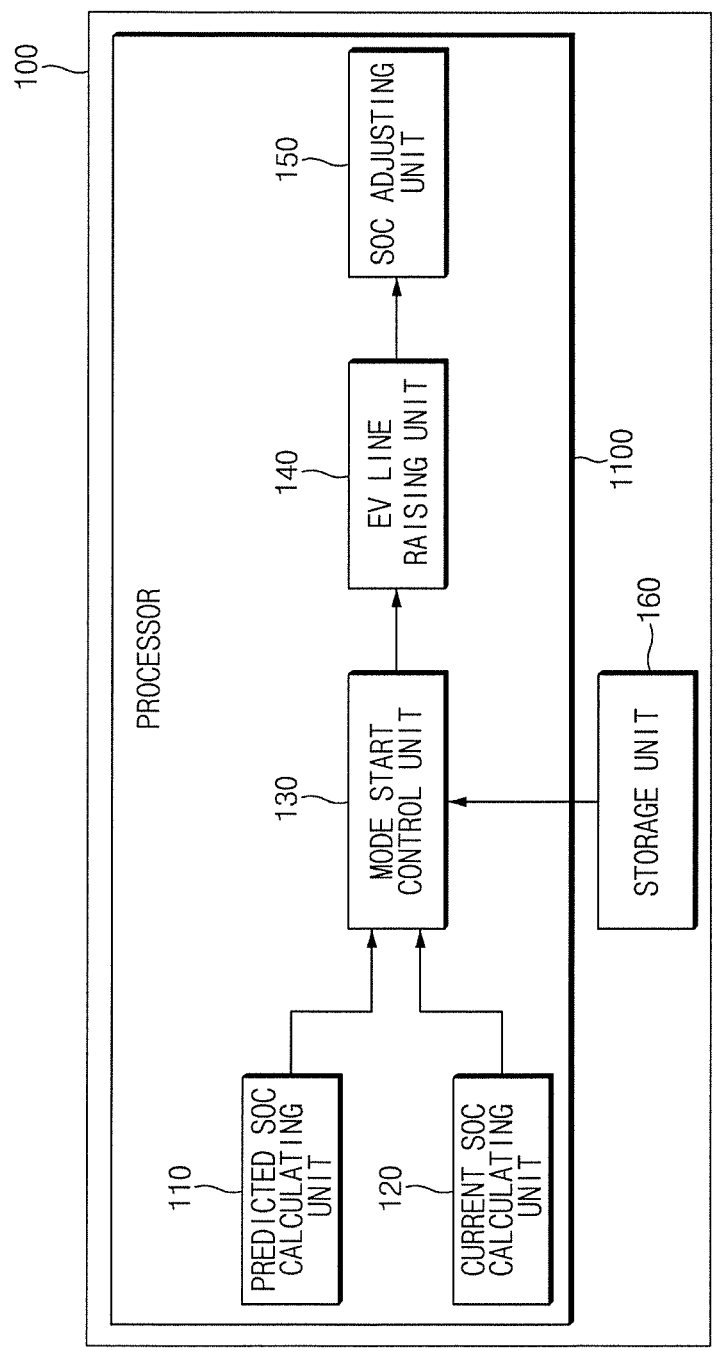
FIG. 3 shows a block diagram of an apparatus for controlling charging of a vehicle according to an embodiment of the present disclosure.

FIG. 3 shows a diagram of an apparatus including a hybrid controller including a processor for controlling charging of an environment-friendly vehicle according to an embodiment of the present disclosure.

The apparatus for controlling charging of an environment-friendly vehicle according to the embodiment of the present disclosure includes a predicted SOC calculating module 110, a current SOC calculating module 120, a mode start control module 130, an EV line raising module 140, an SOC adjusting module 150, and a storage 160. The processor has an associated non-transitory memory storing instructions which, executed by the processor to provide the functionalities of the predicted SOC calculating module 110, the current SOC calculating module 120, the mode start control module 130, the EV line raising module 140, and the SOC adjusting module 150.

The predicted SOC calculating module 110 calculates a predicted SOC that is predicted to be consumed until the vehicle reaches a destination. Then, the predicted SOC refers to an SOC value that is predicted to be discharged from the battery when the vehicle travels in the first mode (EV mode) in which the vehicle travels only with the driving force of the electric motor until the vehicle reaches a destination.

The predicted SOC calculating module 110 may calculate a predicted SOC by using air resistance, rolling resistance, and hill climbing resistance as in Equation 1.

[Equation 1]
$$\text{Predicted } SOC = \frac{\int_0^t ((\text{Air resistance power} + \text{Rolling resistance power} + \text{hill-Climbing resistance power}) * \eta_{DT} * \eta_{TM} * \eta_{Mot} * \eta_{Bat}) dt}{\text{Total battery energy}} * 100$$

$$\text{Air resistance power} + \text{Rolling resistance power} = v * (f_0 + f_1 v + f_2 v^2)$$

$$\text{Hill-climbing resistance power} = v * mg\sin\theta$$

Then, $f_0/f_1/f_2$ is a coast-down value of the vehicle, and refers to a driving resistance value of the vehicle. Further, m is the weight of the vehicle and g is the gravitational acceleration. $\eta_{Dt}$ is an efficiency of a drive train (a drive shaft, a joint, and the like), $\eta_{TM}$ is an efficiency of the transmission, $N_{Mot}$ is an efficiency of the motor, $\eta_{Bat}$ is an efficiency of the battery, and total battery energy is a specification of the battery (a main battery) of the corresponding vehicle. The predicted SOC calculating module 110 calculates an SOC consumed until the vehicle reaches a destination by using time and velocity.

As in Equation 1, the predicted SOC is a value obtained by multiplying sums of air resistance power, rolling resistance power, and hill climbing resistance power with efficiencies of the drive train, efficiencies of the transmission, efficiencies of the motor, and efficiencies of the motor, by integrating the multiplied sums with respect to times of 0 to t, by dividing the integrated value by the total battery energy, and by multiplying the divided value with 100.

The current SOC calculating module 120 calculates a current SOC of the vehicle. Then, the current SOC of the vehicle is for calculating a current charging state of the vehicle, and the current SOC may be calculated by using all common methods.

The mode start control module 130 classifies a first mode (an EV mode=a CD mode) in which the vehicle travels only with driving of the electric motor, a third mode (an HEV mode) in which the vehicle travels through driving of the internal combustion engine, a second mode (an SOC use mode), and a fourth mode (a CS mode).

The first mode is a mode in which the vehicle travels only with driving of the electric motor when the velocity of the vehicle is less than a specific speed or the current SOC of the vehicle is a reference SOC or more. Then, the reference SOC is a value that is calculated in advance when the vehicle is mass-produced and stored in the storage 160, and corresponds to a center SOC of a general hybrid vehicle.

The third mode is a mode in which the vehicle travels only with driving of the electric motor when the velocity of the vehicle is less than a specific speed or the current SOC of the vehicle is a reference SOC or more.

The second mode is a mode in which the vehicle travels with an electrical motor when the current SOC of the vehicle is greater than a sum of a predicted SOC consumed until the vehicle reaches a destination and a target SOC even though the current SOC of the vehicle is less than the reference SOC. Then, the target SOC is a value that is calculated in advance when the vehicle is mass-produced and stored in the storage 160, and is set to an SOC value that is lower than the reference SOC. For example, when the reference SOC is 15%, the target SOC may be set to 5%.

The fourth mode is a mode in which the vehicle travels when the vehicle is a PHEV, and is a mode in which both an EV mode and a HEV mode are possible according to driver requirement power, a current SOC, the velocity of the vehicle, and the like and generally corresponds to a CS mode.

The mode start control module 130 starts an SOC use mode if the current SOC is greater than a sum of the target SOC and the predicted SOC as in Equation 2.

Current SOC>Target SOC+Predicted SOC        [Equation 2]

For example, if the current SOC is 65% and the target SOC is 40%, the vehicle starts the SOC use mode at a point at which the predicted SOC is 25% or more. Conventionally, the vehicle starts an idle charge mode in which the battery is charged and unconditionally uses a fuel while the engine is driven when the current SOC is not more than a predetermined reference SOC (a minimum SOC use area), and the SOC use mode according to the present disclosure is a mode in which the vehicle is driven by using the battery even when the current SOC is the reference SOC, and may improve fuel efficiency by allowing the vehicle to travel in an EV mode in which the battery is maximally used.

When the vehicle is a PHEV, the mode of the vehicle is classified into a CD mode in which the vehicle travels only with electricity and a CS mode in which the vehicle travels in an HEV mode, and conventionally, the vehicle is controlled to be set to the reference SOC for protecting the battery and optimizing fuel efficiency only in a CS mode. According to the present disclosure, when the vehicle is a PHEV, the mode start control module 130 determines whether the vehicle starts the SOC use mode first, and when the vehicle cannot start the SOC use mode, the mode of the vehicle is immediately transited to a CS mode such that the predicted SOC is continuously calculated.

Meanwhile, when the vehicle may start the SOC use mode, the mode start control module 130 performs a control to maintain the CD mode in which the current SOC is maintained or to start the SOC use mode.

If the vehicle starts the SOC use mode, the EV line raising module 140 raises an EV line. Then, the EV line is a reference point for driving the engine while the vehicle travels in an EV mode, and for example, the driver may push an accelerator pedal to drive the engine when the vehicle is accelerated to 20 km/s, and then the EV line is set to 20 km/s. By raising the EV line to 30 km/s, the EV may be maintained while the engine is not driven even though the driver pushes the accelerator pedal to accelerate the vehicle to 20 km/s.

The SOC adjusting module 150 lowers the reference SOC (the minimum SOC use area) by which the vehicle starts the idle charge mode, and allows the vehicle to continuously travel with the power of the battery without starting the idle charge mode even when the SOC is lower than the reference SOC.

The storage 160 stores a target SOC, a reference SOC, and a predicted SOC, a current SOC, vehicle speed information, and the like. In this way, the present disclosure may lower a minimum SOC use area in consideration of a predicted SOC, a target SOC, and a current SOC, thereby increasing the user of a mode using electricity (the battery) (the EV mode) and improving fuel efficiency.

Figure 4:
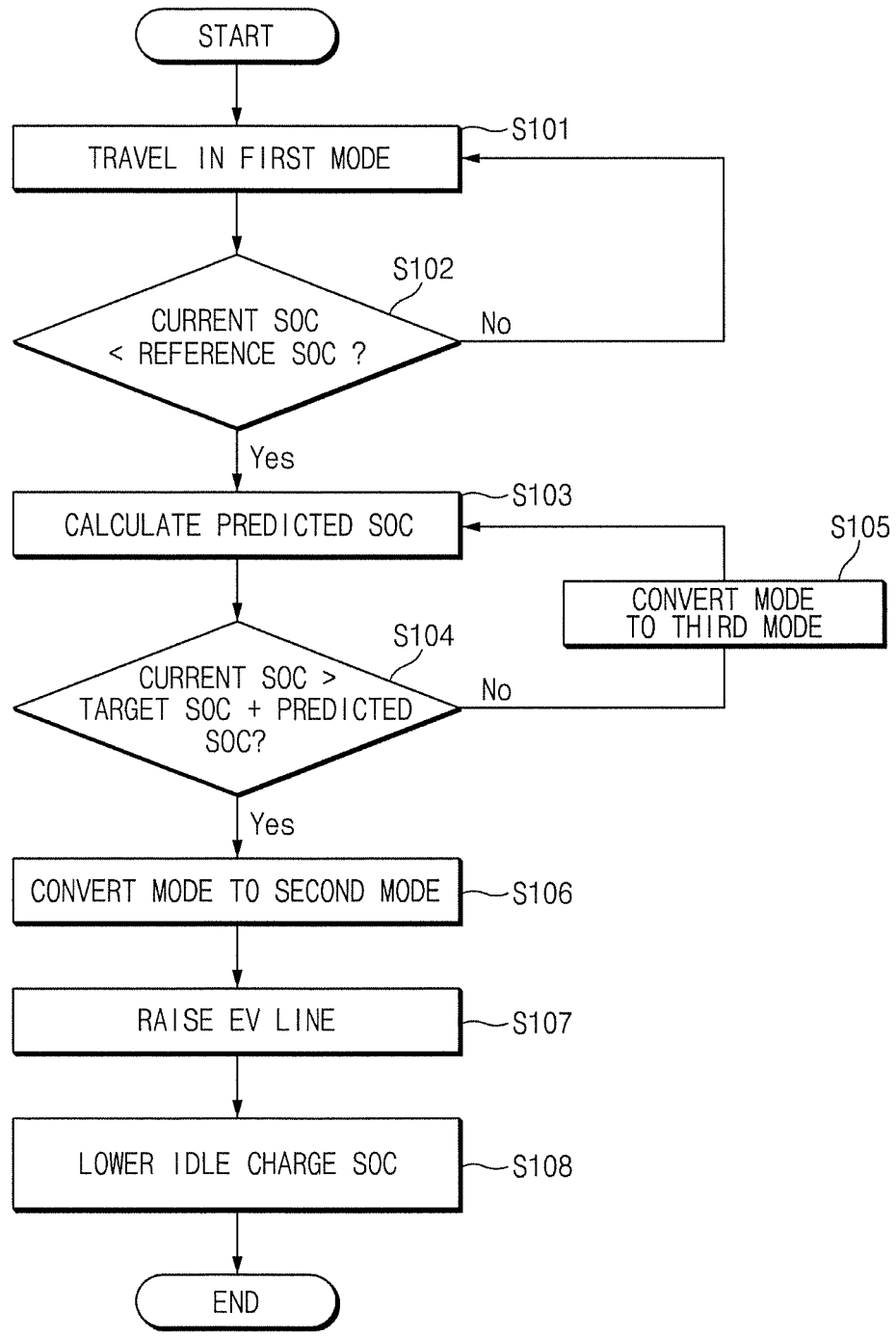
FIG. 4 shows a flowchart illustrating a method of controlling charging of a HEV vehicle according to an embodiment of the present disclosure.

Hereinafter, a method for controlling charging of an HEV according to an embodiment of the present disclosure will be described with reference to FIG. 4. FIG. 4 shows a flowchart illustrating a method of controlling charging of a HEV vehicle according to an embodiment of the present disclosure.

First, if the vehicle is started on, it travels in a first mode that is an EV mode (S101). While the vehicle travels in a first mode, the apparatus including the hybrid controller 100 including the processor 1100 for controlling charging of a vehicle determines whether the current SOC is less than the reference SOC (S102) and the vehicle continues to travel in the first mode when the current SOC is greater than the reference SOC.

Meanwhile, when the current SOC is less than the reference SOC, the apparatus for controlling charging of a vehicle calculates a predicted SOC (S103). Then, the predicted SOC is a predicted SOC consumed when the vehicle travels until the vehicle reaches a destination when the vehicle travels in an EV mode in the current SOC state of the vehicle.

Thereafter, the apparatus including the hybrid controller 100 including the processor 1100 for controlling charging of a vehicle compares a sum of the target SOC and the predicted SOC with the current SOC (S104), and repeats an operation S103 of calculating a predicted SOC when the current SOC is not greater than the sum of the target SOC and the predicted SOC.

Meanwhile, if the current SOC is greater than the sum of the target SOC and the predicted SOC, the apparatus including the hybrid controller 100 including the processor 1100 for controlling charging of a vehicle starts the second mode (SOC use mode) (S106), raises the EV line (S107), and lowers the idle charge SOC such that the idle charge SOC is lower than the reference SOC (S108).

Then, the EV line is a reference point for driving the engine while the vehicle travels in an EV mode, and for example, the driver may push an accelerator pedal to drive the engine when the vehicle is accelerated to 20 km/s, and then the EV line is set to 20 km/s. By raising the EV line to 30 km/s, the EV may be maintained while the engine is not driven even though the driver pushes the accelerator pedal to accelerate the vehicle to 20 km/s.

Further, by lowering an SOC for starting an idle charge mode such that the SOC is lower than the reference SOC to prevent the engine from being driven even through the current SOC reaches the reference SOC or the vehicle from entering the idle charge mode, the vehicle may start an idle charge mode if the current SOC reaches the lowered SOC after the vehicle travels with electrical energy.

Figure 5:
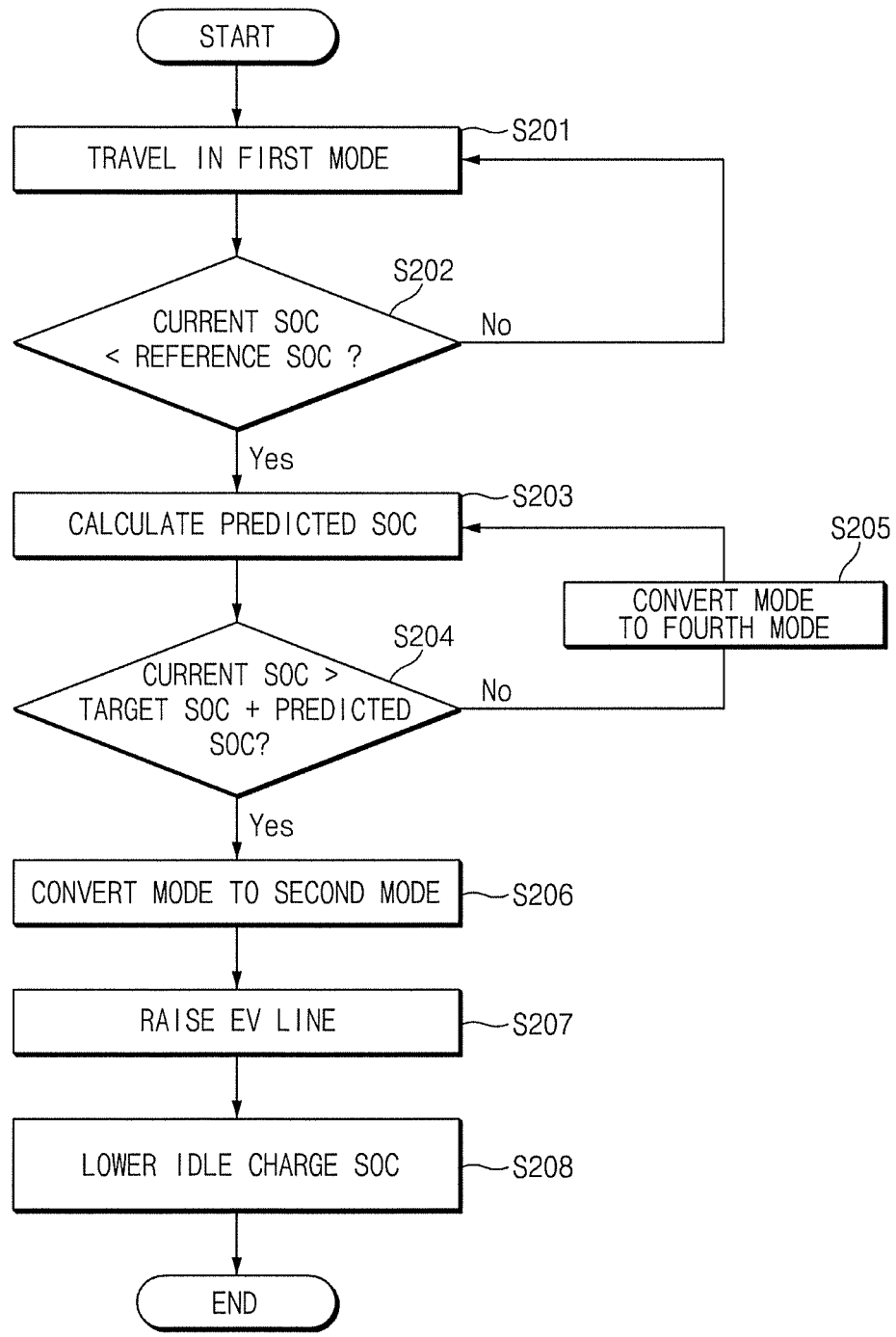
FIG. 5 shows a flowchart illustrating a method of controlling charging of a PHEV vehicle according to an embodiment of the present disclosure.

Hereinafter, a method for controlling charging of a PHEV according to an embodiment of the present disclosure will be described with reference to FIG. 5. FIG. 5 shows a flowchart illustrating a method of controlling charging of a PHEV vehicle according to an embodiment of the present disclosure.

First, if the vehicle is started on, the vehicle travels in a first mode that is a CD mode (that is the same as the EV mode) in which the vehicle travels only with the force of an electric motor (S201). While the vehicle travels in a first mode, the apparatus including the hybrid controller 100 including the processor 1100 for controlling charging of a vehicle determines whether the current SOC is less than the reference SOC (S202) and the vehicle continues to travel in the first mode when the current SOC is greater than the reference SOC.

Meanwhile, when the current SOC is less than the reference SOC, the apparatus including the hybrid controller 100 including the processor 1100 for controlling charging of a vehicle calculates a predicted SOC (S203). Then, the predicted SOC is a predicted SOC consumed when the vehicle travels until the vehicle reaches a destination when the vehicle travels in an EV mode in the current SOC state of the vehicle.

The apparatus including the hybrid controller 100 including the processor 1100 for controlling charging of a vehicle compares a sum of the target SOC and the predicted SOC with the current SOC (S204). When the current SOC is not greater than the sum of the target SOC and the predicted SOC, the mode of the vehicle is converted to the fourth mode (CS mode) (S205). Then, the CS mode is a mode in which the vehicle travels in both of the EV mode and the HEV mode according to driver requirement power, a current SOC, a velocity of the vehicle, and the like.

Meanwhile, if the current SOC is greater than the sum of the target SOC and the predicted SOC, the apparatus including the hybrid controller 100 including the processor 1100 for controlling charging of a vehicle starts the second mode (SOC use mode) (S206), raises the EV line (S207), and lowers the idle charge SOC such that the idle charge SOC is lower than the reference SOC (S208). That is, by lowering an SOC for starting an idle charge mode such that the SOC is lower than the reference SOC to prevent the engine from being driven even through the current SOC reaches the reference SOC or the vehicle from entering the idle charge mode, the vehicle may start an idle charge mode if the current SOC reaches the lowered SOC after the vehicle travels with electrical energy.

Figure 6:
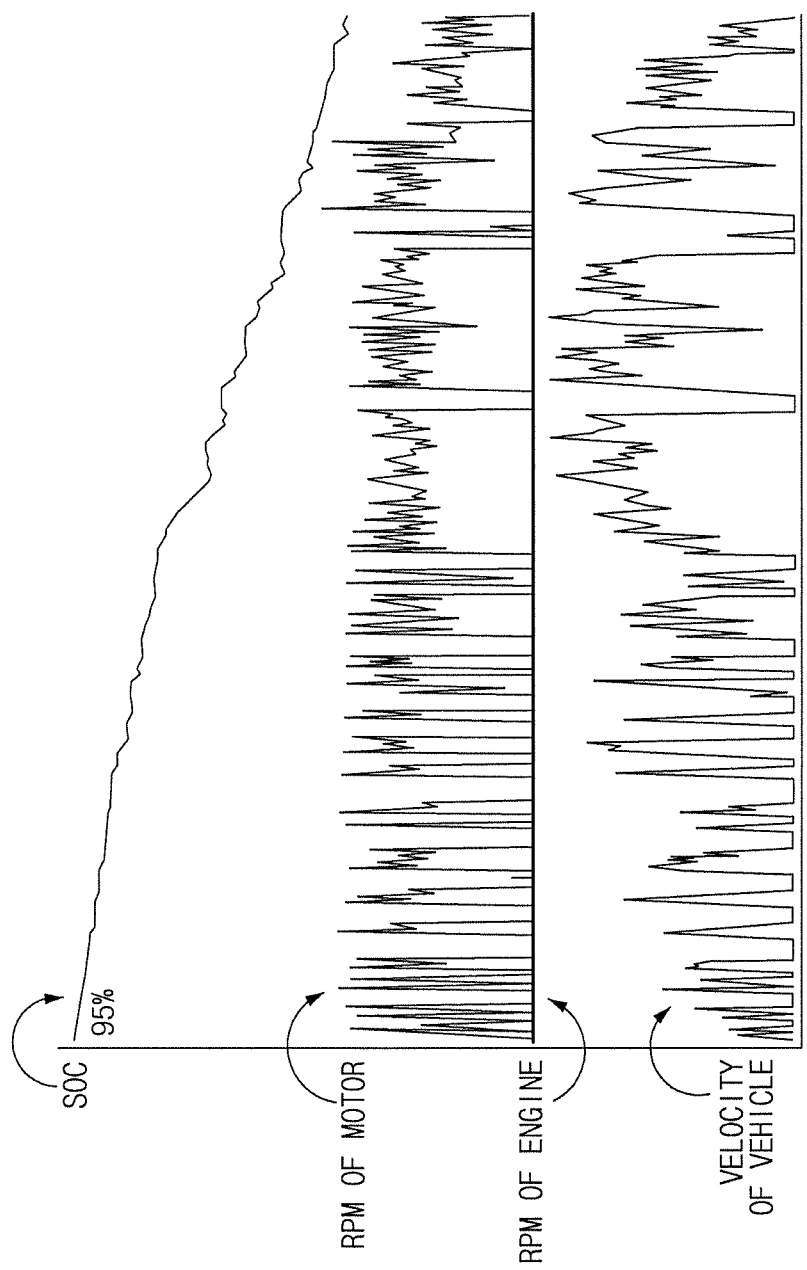
FIG. 6 shows a graph illustrating an engine driving time point according to a charging control according to an embodiment of the present disclosure.

FIG. 6 shows a view illustrating an RPM of an engine according to a charging control according to an embodiment of the present disclosure. FIG. 6 shows a graph in which the transverse axis represents time and the longitudinal axis represents velocity, and when FIG. 6 is compared with FIG. 1, it can be seen that the engine may not be driven when the present disclosure of FIG. 6 is applied even though FIG. 1 illustrates that the engine is driven at a point A that is not more than the reference SOC.

In this way, the present disclosure may improve fuel efficiency by restraining discharging-oriented control for adjusting the SOC to the reference SOC as the SOC is raised when the vehicle is restarted while the SOC is set to the reference SOC during parking, by lowering the minimum use area of the SOC.

Further, the present disclosure may minimize a sense of incompatibility of the driver and noise of the engine around a residential area by minimizing unnecessary driving of the engine around a destination by inducing the vehicle to travel by maximally using electricity (the battery) until the vehicle reaches a vicinity of the destination.

Figure 7:
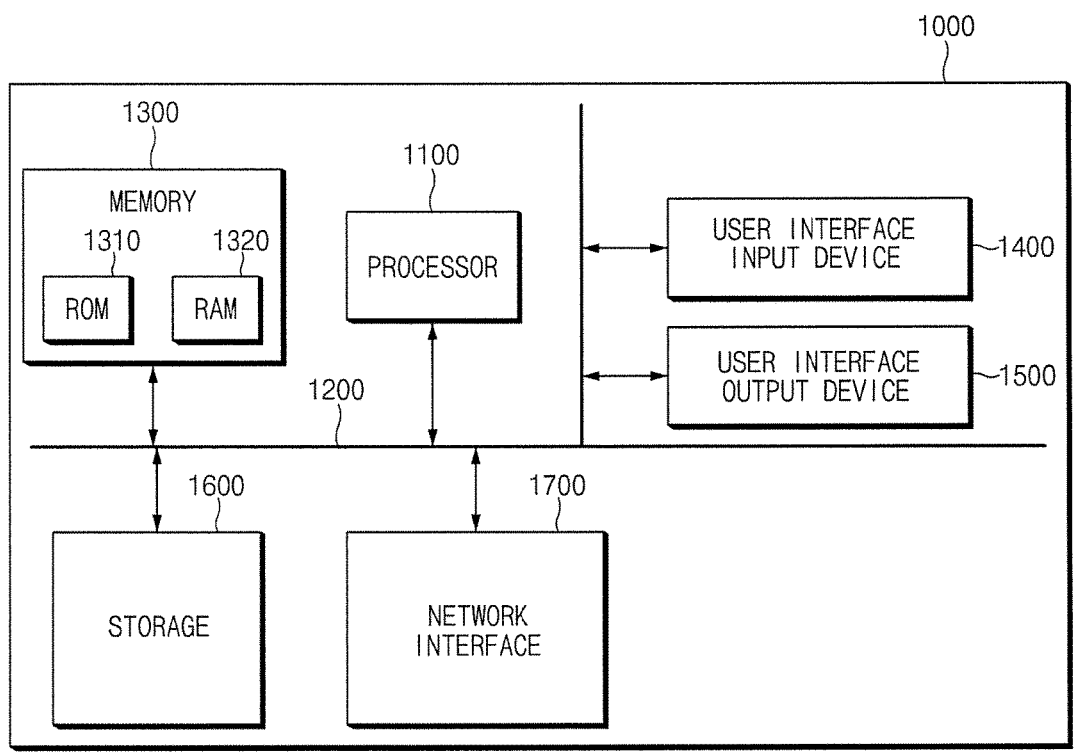
FIG. 7 shows a block diagram of a computer system to which the method for controlling charging of a vehicle according to an embodiment of the present disclosure is applied.

FIG. 7 shows a diagram of a computer system to which the method for controlling charging of an environment-friendly vehicle according to an embodiment of the present disclosure is applied.

Referring to FIG. 7, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The present technology may enhance fuel efficiency by lowering a minimum use area of the SOC and improving the driving mode using electrical energy.

Further, the present technology may minimize unnecessary driving of an engine in the vicinity of a destination, thereby reducing a sense of incompatibility of the driver and engine driving noise.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for controlling charging of a vehicle, the apparatus comprising:
a controller including a processor communicatively connected to the controller and configured to form:
a predicted state of charge (SOC) calculating module configured to calculate a predicted SOC predicted to be consumed when the vehicle travels until the vehicle reaches a destination;
a current SOC calculating module configured to calculate a current SOC of the vehicle;
a mode start control module configured to determine a first mode in which the vehicle travels through driving of an electric motor and a second mode in which the vehicle travels through driving of an electric motor even though the current SOC is not more than a reference SOC, by using the predicted SOC and the current SOC; and
an SOC adjusting module configured to adjust a minimum SOC use area when the vehicle starts the second mode.

2. The apparatus of claim 1, wherein the predicted SOC calculating module calculates the predicted SOC by using air resistance, rolling resistance, and hill-climbing resistance.

3. The apparatus of claim 2, wherein the air resistance and the rolling resistance are calculated by using a velocity and a coast-down value of the vehicle.

4. The apparatus of claim 1, wherein the mode start control module starts the second mode when the current SOC is greater than a sum of a target SOC and the predicted SOC.

5. The apparatus of claim 4, wherein when the vehicle is a hybrid electric vehicle (HEV), the mode start control module starts a third mode in which the vehicle travels through driving of an engine when the current SOC is less than the reference SOC and is less a sum of the target SOC and the predicted SOC.

6. The apparatus of claim 4, wherein when the vehicle is a plug-in hybrid electric vehicle (PHEV), the first mode is in a charge depleting (CD) mode in which the vehicle travels by using electricity.

7. The apparatus of claim 6, wherein the mode start control module starts a fourth mode that is a charge sustaining (CS) mode in which the vehicle travels through both driving of an electric motor and an engine when the current SOC is less than the reference SOC and is less than the sum of the target SOC and the predicted SOC.

8. The apparatus of claim 1, further comprising:
an EV line raising module configured to, when the second mode is started, raise an EV line that is a reference condition for driving an engine.

9. The apparatus of claim 1, wherein the minimum SOC use area corresponds to a minimum SOC for starting an idle charge mode.

10. The apparatus of claim 1, wherein the SOC adjusting module lowers the minimum SOC use area.

11. The apparatus of claim 1, wherein the SOC adjusting module lowers the minimum SOC use area to lower the reference SOC such that the vehicle does not start an idle charge mode even though the current SOC reaches a predetermined reference SOC when the vehicle starts the second mode.

12. A vehicle system comprising:
a battery configured to electrical energy to a vehicle;
a controller including a processor communicatively connected to the controller for controlling charging of the vehicle, the processor being configured
to calculate a predicted SOC and a current SOC,
to control whether the vehicle starts a first mode in which the vehicle travels with electrical energy or a second mode in which the vehicle travels until the vehicle reaches a destination with electrical energy even though the current SOC is not more than a reference SOC by using the predicted SOC and the current SOC, and
to induce a driving mode using the electrical energy by lowering a minimum SOC use area when the vehicle starts the second mode.

13. The system of claim 12, wherein the processor being configured to form:
a predicted SOC calculating module configured to calculate a predicted SOC predicted to be consumed when the vehicle travels until the vehicle reaches a destination;
a current SOC calculating module configured to calculate a current SOC of the vehicle;
a mode start control module configured to determine whether the vehicle starts a first mode in which the vehicle travels with electrical energy or a second mode in which the vehicle travels with electrical energy until the vehicle reaches a destination even though the current SOC is not more than a reference SOC, by using the predicted SOC and the current SOC; and
an SOC adjusting module configured to adjust a minimum SOC use area when the vehicle starts the second mode.

14. A method for controlling charging of a vehicle, the method comprising:
calculating, by a processor, a predicted SOC predicted to be consumed when the vehicle travels until the vehicle reaches a destination;
calculating, by the processor, a current SOC of the vehicle;
determining, by the processor, whether the vehicle starts a first mode in which the vehicle travels with electrical energy and a second mode in which the vehicle travels with electrical energy even though the current SOC is not more than a reference SOC, by using the predicted SOC and the current SOC; and
lowering a minimum SOC use area when the vehicle starts the second mode.

15. The method of claim 14, wherein the determining of whether the vehicle starts the first mode or the second mode includes:
if the current SOC is greater than a predetermined reference SOC, controlling the vehicle such that the vehicle starts a first mode (EV mode);
when the current SOC is less than the reference SOC and more than a sum of a target SOC and the predicted SOC, starting a second mode (SOC use mode); and
when the current SOC is less than the reference SOC and less than the sum of the target SOC and the predicted SOC, starting a third mode (HEV mode).

16. The method of claim 15, wherein the determining of whether the vehicle starts the first mode or the second mode includes:
if the current SOC is greater than a predetermined reference SOC, controlling the vehicle such that the vehicle starts a first mode (CD mode);
when the current SOC is less than the reference SOC and more than a sum of a target SOC and the predicted SOC, starting a second mode (SOC use mode); and
when the current SOC is less than the reference SOC and less than the sum of the target SOC and the predicted SOC, starting a third mode (CS mode).

17. The method of claim 14, further comprising:
when the second mode is started, raising an EV line that is a reference condition for driving an engine.

18. The method of claim 14, wherein the calculating the predicted SOC includes:
calculating the predicted SOC by using air resistance, rolling resistance, and hill-climbing resistance.

19. The method of claim 14, wherein the minimum SOC use area corresponds to a minimum SOC for starting an idle charge mode.

20. The method of claim 19, wherein the lowering of the minimum SOC use area includes:
lowering the minimum SOC use area to lower the reference SOC such that the vehicle does not start an idle charge mode even though the current SOC reaches a predetermined reference SOC when the vehicle starts the second mode.

* * * * *